United States Patent
Kruspe et al.

(10) Patent No.: US 6,439,046 B1
(45) Date of Patent: Aug. 27, 2002

(54) APPARATUS AND METHOD FOR SYNCHRONIZED FORMATION MEASUREMENT

(75) Inventors: Thomas Kruspe, Wienhausen; Hartmut Schrader, Nienhagen, both of (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/639,397

(22) Filed: Aug. 15, 2000

(51) Int. Cl.⁷ .............. G01V 1/16; G01V 1/40; E21B 43/12; E21B 44/00; G01R 33/20

(52) U.S. Cl. .............. 73/152.01; 73/152.03

(58) Field of Search .......... 73/152.01, 152.46, 73/152.45, 152.03, 152.19; 175/40, 50

(56) References Cited

U.S. PATENT DOCUMENTS

| | | | | |
|---|---|---|---|---|
| 3,252,225 A | * | 5/1966 | Hixson | 33/205 |
| 3,268,908 A | * | 8/1966 | Allen | 346/17 |
| 3,292,904 A | * | 12/1966 | Fubenback et al. | 254/145 |
| 3,494,187 A | * | 2/1970 | Warren | 73/152 |
| 3,707,700 A | | 12/1972 | Lafont | 340/18 |
| 3,817,345 A | * | 6/1974 | Bailey | 181/0.5 NP |
| 4,416,152 A | * | 11/1983 | Wilson | 73/155 |
| 5,034,929 A | * | 7/1991 | Cobern et al. | 367/83 |
| 5,519,668 A | * | 5/1996 | Montaron | 367/35 |
| 5,608,215 A | * | 3/1997 | Evans | 250/269.6 |
| 5,629,623 A | * | 5/1997 | Sezginer et al. | 324/303 |
| 5,803,186 A | * | 9/1998 | Berger et al. | 175/50 |
| 5,923,170 A | | 7/1999 | Kuckes | 324/326 |
| 5,975,204 A | * | 11/1999 | Tubel et al. | 166/250.15 |
| 6,051,973 A | | 4/2000 | Prammer | 324/303 |
| 6,079,505 A | | 6/2000 | Pignard et al. | 175/40 |
| 6,268,726 B1 | * | 7/2001 | Prammer et al. | 324/303 |

FOREIGN PATENT DOCUMENTS

| | | |
|---|---|---|
| EP | 1072903 A1 | 1/2001 |
| GB | 2317955 A | 1/1998 |
| GB | 2341685 A | 3/2000 |
| NO | 0314654 A1 | 5/1989 |
| WO | WO98/25164 | 6/1998 |

\* cited by examiner

*Primary Examiner*—Hezron Williams
*Assistant Examiner*—David J. Wiggins
(74) *Attorney, Agent, or Firm*—Madan, Mossman & Sriram, P.C.

(57) ABSTRACT

The present invention provides an apparatus and method for minimizing movement of a drill string during MWD with vibration-sensitive instruments comprising conveying a drill string into a borehole with a sensor mounted on the drill string for sensing a parameter of interest of a formation. A clocked controller is disposed on the drill string for controlling timing of the sensor; and a second clocked controller is disposed at a surface location. During drilling operations, the clocked controllers are synchronized such that the surface controller is performing certain tasks in timed sequence with the sensor even though the surface controller is not connected to the sensor.

23 Claims, 5 Drawing Sheets

APPARATUS AND METHOD FOR SYNCHRONIZED FORMATION MEASUREMENT

BACKGROUND OF THE INVENTION

1. Field of the Invention

This invention relates generally to oil well tools, and more particularly to down-hole measurement tools.

2. Description of the Related Art

In the oil and gas industry, hydrocarbons are recovered from formations containing oil and gas by drilling a well borehole into the formation using a drilling system. The system typically comprises a drill bit carried at an end of a drill string. The drill string is comprised of a tubing which may be drill pipe made of jointed sections or a continuous coiled tubing and a drilling assembly that has a drill bit at its bottom end. The drilling assembly is attached to the bottom end of the tubing. To drill a borehole, a mud motor carried by the drilling assembly rotates the drill bit, or the bit is coupled to drill pipe, which is rotated by surface motors. A drilling fluid, also referred to as mud, is pumped under pressure from a source at the surface (mud pit) through the tubing. The mud serves a variety of purposes. It is designed to provide the hydrostatic pressure that is greater than the formation pressure to avoid blowouts. The mud drives the drilling motor (when used) and it also provides lubrication to various elements of the drill string. The mud is also used in many systems as a signal transmission medium using a transmission method known as mud-pulse telemetry.

It is often desirable to gather information of a specific formation once the borehole reaches an area known in the art as the zone of interest. At the zone of interest, down-hole instruments and/or sampling devices are utilized to gather data regarding various parameters of interest including pressure, temperature and other physical and chemical properties of the formation fluid and or mud. The down-hole operations are known as measurement while drilling (MWD) or logging while drilling (LWD).

One MWD method used to determine characteristics of formation fluid is known as nuclear magnetic resonance or NMR well logging. NMR well logging instruments can be used for determining properties of earth formations including the fractional volume of pore space and the fractional volume of mobile fluid filling the pore spaces of the earth formations.

In NMR tools, a magnet is used to produce a static magnetic field in the formation. The static field aligns the nuclear spins within the formation. An RF field is applied to realign nuclear spins generally perpendicular to the static field. At the end of the RF pulse, the nuclear spins precess back towards alignment with the static field. Signals generated from the precessing spins are picked up by a receiver. The tools use an antenna for creating the RF field and for receiving the echo signal from the formation fluid being analyzed. High gain amplifiers are utilized to amplify the received echo prior to processing the signal, but it is very important that the echo is distinguishable over other signals known as noise.

A major problem with NMR testing relates to tool movement. A typical pulse NMR measurement is sensitive to movement such as vibration, axial, horizontal and rotational displacements with respect to the formation. These types of movement during a test may induce noise in the system, and will deteriorate the NMR result, sometimes to the extent that test data is invalidated.

SUMMARY OF THE INVENTION

The present invention addresses the problems encountered when testing formations with movement-sensitive instruments during drilling operations. The invention provides an apparatus and method to minimize vibrations caused by drilling operations at during periods of testing.

The present invention provides an apparatus for MWD comprising drill string with a sensor mounted on the drill string for sensing a parameter of interest of a formation. A clocked controller is disposed on the drill string for controlling timing of the NMR data acquisition; and a second clocked controller is disposed at a surface location. During drilling operations, the two clocked controllers are initially synchronized such that the surface controller is performing certain tasks in timed sequence with the sensor even though the surface controller is not connected to the sensor.

The present invention also provides a method for MWD comprising conveying a drill string into a well borehole and sensing a parameter of interest of a formation traversed by the borehole with a sensor mounted on the drill string. The method also includes controlling timing of the sensor with a first clocked controller disposed on the drill string, and synchronizing a second clocked controller disposed at a surface location with the first clocked controller.

The benefits accorded by the present invention are, among others, cost savings and drilling efficiency. The cost savings are realized when expensive testing is not repeated due to data corruption by unnecessary movement. The drilling operations are more efficient, because drilling is only halted for the brief amount of time a test is performed. Drilling is resumed at the precise moment a test is complete.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENTS

Figure 1:
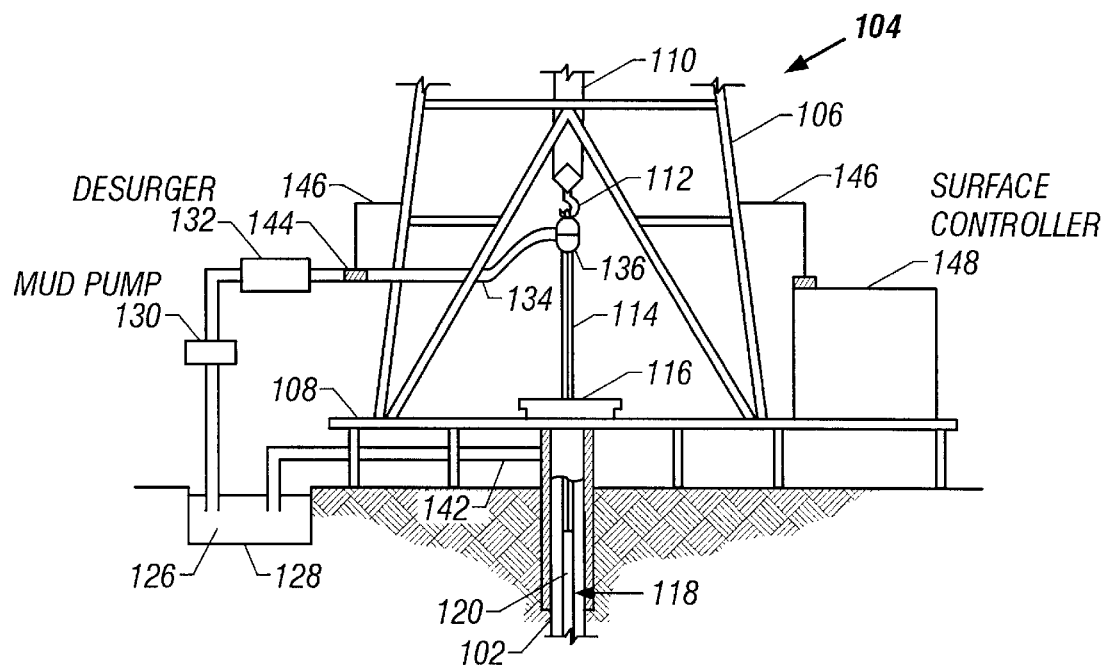
FIG. 1 is an elevation view of an overall simultaneous drilling and logging system that incorporates an embodiment of the present invention.
Figure 1:
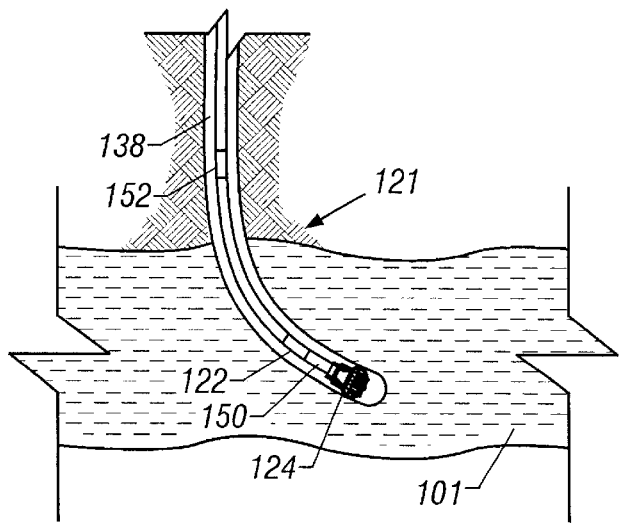

Referencing FIG. 1, an elevation view of a simultaneous drilling and logging system that incorporates an embodiment of the present invention is shown wherein measurements are taken on a formation 101.

A well borehole 102 is being drilled into the earth under control of surface equipment including a rotary drilling rig 104. In accordance with a conventional arrangement, rig 104 includes a derrick 106, derrick floor 108, draw works 110, hook 112, kelly joint 114, rotary table 116, and drill string 118 that includes drill pipe 120 secured to the lower end of kelly joint 114 and to the upper end of a section of drill collars including, but not separately shown, an upper drill collar, an intermediate drill collar, and a lower drill collar bottom hole assembly (BHA) 121 immediately below the intermediate sub. The lower end of the BHA 121 carries a downhole tool 122 of the present invention and a drill bit 124.

Drilling mud 126 is circulated from a mud pit 128 through a mud pump 130, past a desurger 132, through a mud supply line 134, and into a swivel 136. The drilling mud 126 flows down through-the kelly joint 114 and an axial central bore in the drill string, and through jets (not shown) in the lower face of the drill bit. Borehole fluid 138 containing drilling mud, cuttings and formation fluid flows back up through the annular space between the outer surface of the drill string and the inner surface of the borehole to be circulated to the surface where it is returned to the mud pit through a mud return line 142. A shaker screen (not shown) separates formation cuttings from the drilling mud before the mud is returned to the mud pit.

The system in FIG. 1 uses mud pulse telemetry techniques to communicate data from down hole to the surface during drilling operations. To receive data at the surface, there is a transducer 144 in mud supply line 132. This transducer generates electrical signals in response to drilling mud pressure variations, and a surface conductor 146 transmits the electrical signals to a surface controller 148.

Optionally, the drill string 118 can have a downhole drill motor 150 for rotating the drill bit 124. Incorporated in the drill string 118 above the drill bit 124 is the downhole tool 122 of the present invention, which will be described in greater detail hereinafter. A telemetry system 152 is located in a suitable location on the drill string 118 such as above the tool 122. The telemetry system 152 is used to receive commands from, and send data to, the surface via the mud-pulse telemetry described above.

Figure 2A:
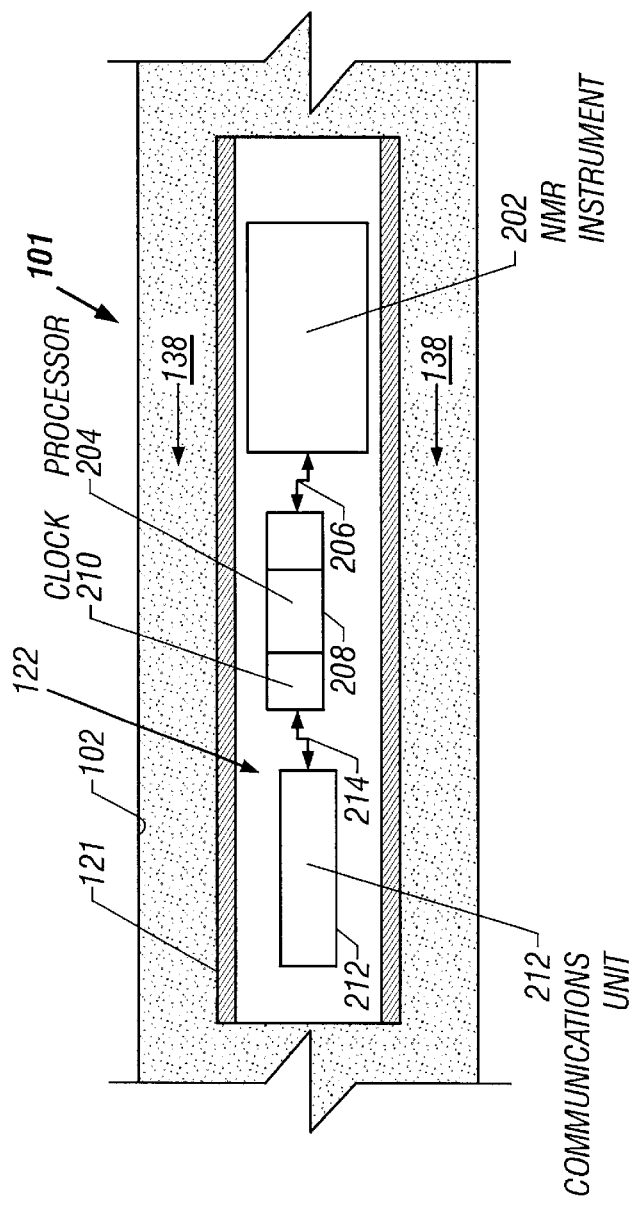
FIG. 2A is a cross section view of a portion of the present invention showing a BHA disposed in a borehole.
Figure 2B:
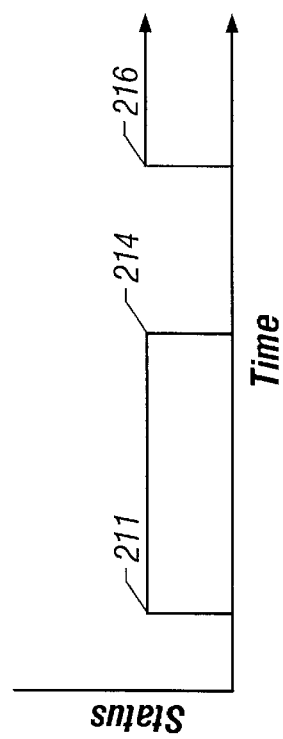
FIG. 2B is a timing graph of a typical test sequence using the embodiment of FIG. 2A.

Reference will now be made to FIGS. 2A and 2B for further description of downhole components associated with the present invention. FIG. 2A is a cross section view of a portion of a BHA 121 disposed in a borehole 102. Borehole fluid 138 containing drilling mud, formation fluid and cuttings is shown flowing toward the surface in an annulus between the BHA 121 and borehole wall 102. Mounted in the BHA 121 is a formation testing tool 122 including a movement-sensitive component such as a NMR instrument 202. The instrument 202 is connected to a downhole controller 204 via a suitable interface such as electrical conductors 206. Inside the controller 204 are a processor 208 and a synchronizing clock 210. The processor 208 and clock 210 operate together to control the instrument 202 such that the instrument performs tests on the formation 101 at a predetermined periodic rate as shown in FIG. 2B.

The controller 204 also interfaces with a communication unit 212 via electrical conductors 214. The communications unit 212 transmits signals to a complementary surface unit (148 in FIG. 1). The transmission method is typically mud-pulse telemetry, but may be any other suitable method.

FIG. 2B is a timing graph showing a typical test sequence using the embodiment of FIG. 2A. The downhole controller 204 activates the NMR instrument 202 automatically at a predetermined time 211. The instruments tests for a period of time controlled by the controller 204 and clock 210. The instrument is deactivated at another predetermined time 214 when the test is complete. The tool remains deactivated until the next test time period 216 begins.

Figure 3A:
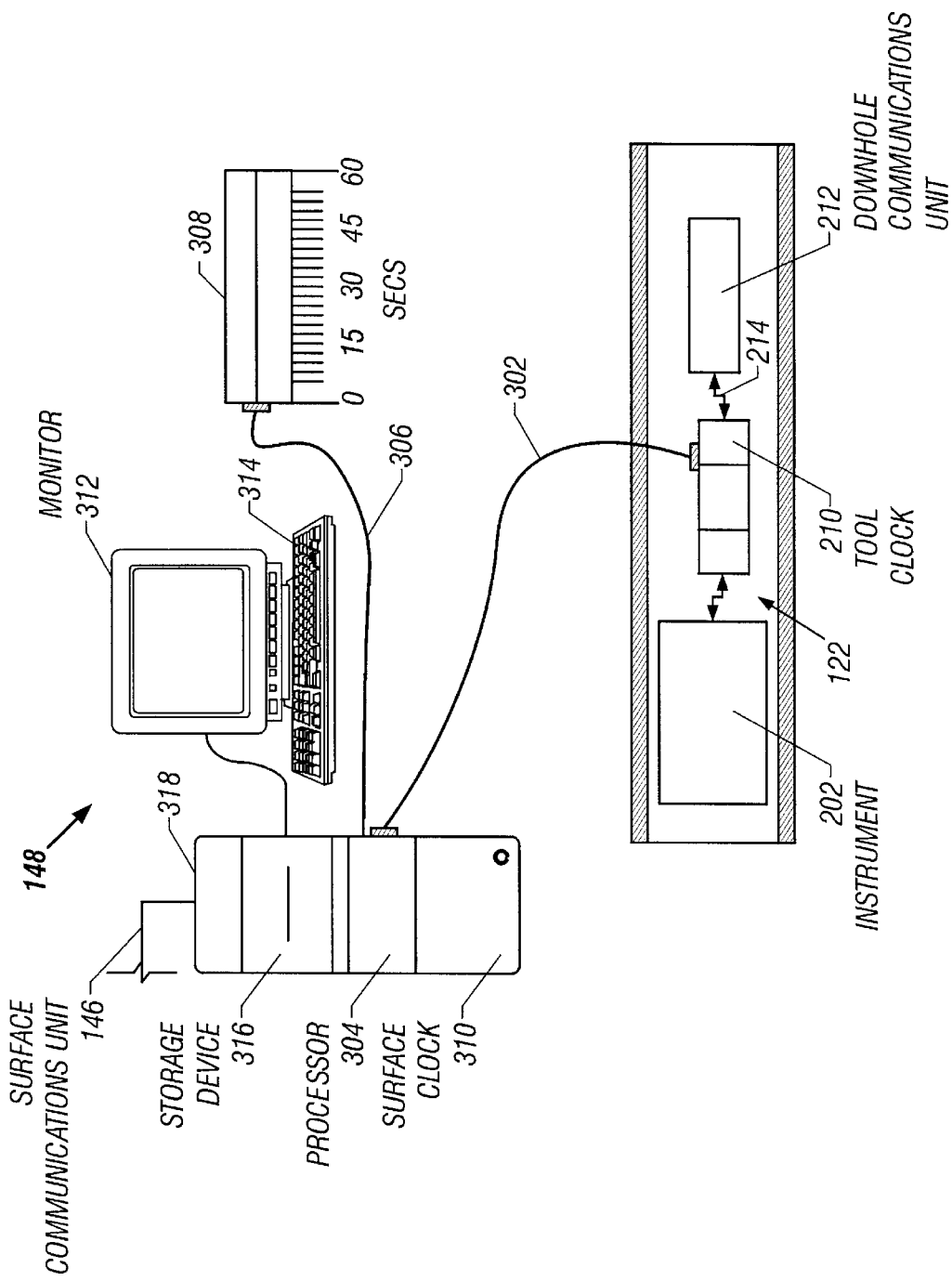
FIG. 3A shows a surface controller according to an embodiment of the present invention connected to the down-hole tool of FIG. 2A while the tool is at the surface.

FIG. 3A shows a surface controller according to an embodiment of the present invention connected to the downhole tool 122 of FIG. 2A while the tool 122 is at the surface. A detachable cable 302 connects the tool clock 210 to a surface processor 304 disposed in the surface controller 148. Another similar cable 306 connects the processor 304 to a surface display unit 308. The display unit 308 is a standard display graduated in units of time, preferably seconds. An independent surface clock 310 mounted in the controller 148 drives the display 308. The surface processor 304 synchronizes the independent downhole clock 210 with the independent surface clock 310 such that the display 308 will show the status of the downhole tool 122 even though the downhole clock 210 operates autonomously once the detachable cable 302 is removed.

Other useful components may be integrated into or connected to the surface controller 148. A monitor 312 and keyboard 314 may be used for operator interface with the controller. A storage device 316 such as a disk or hard drive may be associated with the surface processor 304 for storing commands and data. Commands and data signals can be transmitted to and from downhole via a surface communications unit 318, which is complementary to the downhole communications unit 212.

Figure 3B:
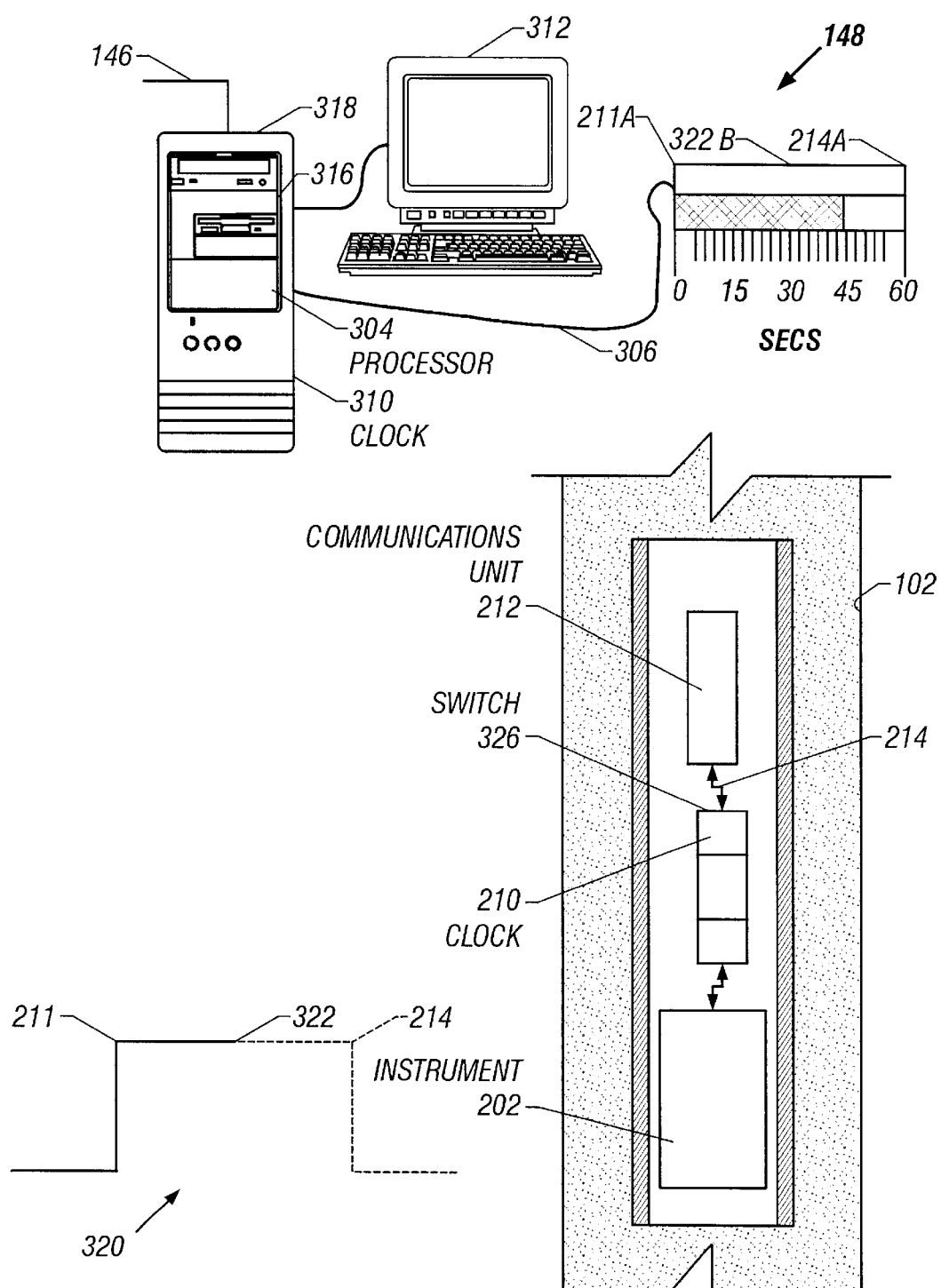
FIG. 3B shows the surface display of FIG. 3A operating in synchronization with the down-hole tool.

FIG. 3B shows the surface display 308 operating in synchronization with the downhole tool 122. The display 308 includes a start point 211A and end point 214A along with predetermined graduated intervals between the start and end points 211A and 214A. The timing graph 320 indicates that the instrument 202 begins a test at a start point 211, ends a test at an end point 214 and is off for a predetermined duration. As shown the downhole tool is in testing mode at a given point in time 322 i.e. 45 seconds into the test. The surface display 308 indicates 45 seconds 322A at the same point during the test with a shaded bar 324 or other indicator, even though the surface clock 310 and downhole clock 210 are not connected.

Another embodiment according to the present invention includes downhole synchronization rather than surface synchronization as described above. Referring to FIGS. 3A and 3B, this alternate embodiment does not include the detachable cable 302. The downhole clock 210 includes an activation mechanism 326. The mechanism can be any suitable known electronic switch capable of remote activation. The switch 326 is activated by a command transmitted from the surface to the downhole communications unit 212. The communications unit 212 sends the command via the interface conductor 214 to the switch 326 disposed in the controller 204. The switch 326 controls the downhole clock 210 by providing power to define the start point 211. The predetermined test routine as described above can then commence.

Figure 4:
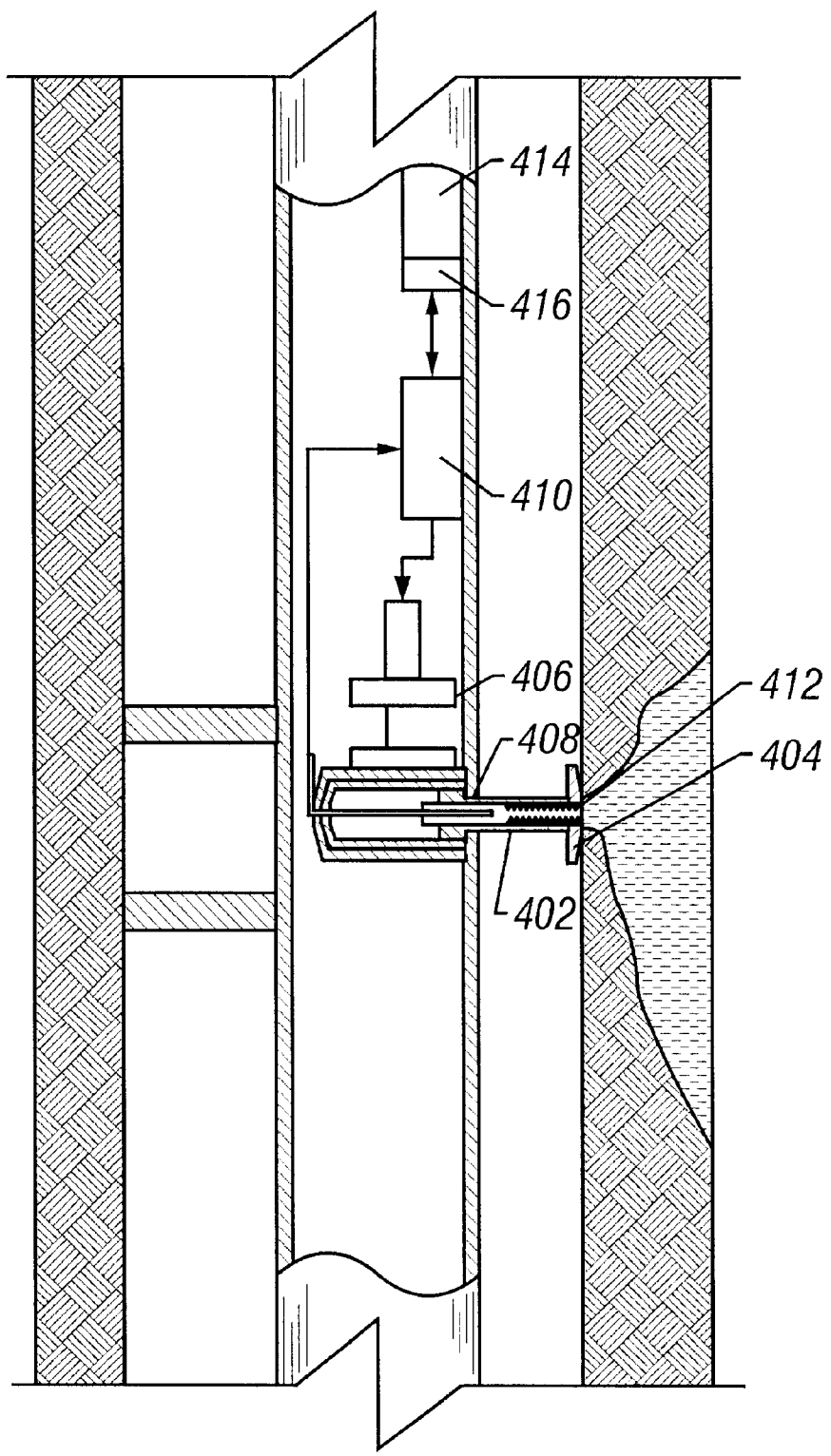
FIG. 4 shows a tool according to the present invention wherein a selectively extendable probe is used to extract fluid from a formation.

The apparatus described above and shown in FIGS. 1 through 3B may be modified using FTWD elements known to those skilled in the art without deviating from the spirit and scope of the present invention. FIG. 4 shows an exemplary tool according to an embodiment of the present invention wherein a selectively extendable probe 402 well known in the art is used to extract formation fluid for analysis in the tool 122. A pad seal 404 seals a portion of the borehole wall when the probe 402 is extended. The probe may be extended by a power source 406 such as a hydraulic system, mud motor or electric motor. A biasing element 408 such as a spring is preferably used to bias the probe in a retracted position, but biasing in the extended position is also used in some cases. A pump 410 housed in the drill string and connected to a port 412 in the probe 402 is used to extract fluid from the formation by reducing pressure at the port 412. A sample chamber 414 in the drill string receives the extracted fluid, and a sensor 416 senses characteristics of the extracted fluid to determine a parameter of interest for the formation.

Various sensors may be used in conjunction with or in lieu of the NMR sensor described above for sensing the characteristics of the extracted fluid. Any of several well-known sensors may be incorporated in the tool for formation fluid investigations by sensing porosity, pore-size distribution, hydrocarbon identification, acoustic velocity, and formation pressure.

A BHA is synchronized above ground in one method according to the present invention. The method can be described in three phases. In the first phase, the downhole tool is synchronized with a surface display by connecting the tool clock 210 and display clock 310 to a surface controller 148. The controller is used to synchronize the two clocks. The tool is disconnected from the surface controller once the two clocks are synchronized.

Phase two begins by conveying the tool into the borehole on a drill string 118. The tool remains in an off state for a predetermined amount of time as the drill string progress through the formation. The surface clock is driving the surface display 308 at the same time as the tool clock continues to run.

Phase 3 is a monitoring phase. A drilling operator uses the surface display to monitor the status of the downhole tool. When the surface display indicates a test is about to begin, the operator signals appropriate personnel to stop all drilling. The drilling systems are shut down before the time 211 that the downhole tool begins a test routine as indicated 211A on the display unit. There is minimum vibration during the test routine, because no machinery is running. During this operating interval, the sensor receives signals that are analyzed by the downhole processor to obtain transverse and/or longitudinal relaxation times of nuclei in the formation and/or other parameters such as porosity, pore-size distribution, hydrocarbon identification, acoustic velocity, formation pressure, and dielectric constant of formation. These parameters may fluid may be obtained using the above sensor if applicable or other appropriate sensor known in the art. When the display indicates the test is complete 214A, the operator signals the appropriate personnel to resume drilling. The drilling is resumed at the moment testing is complete 214.

Sending a start pulse downhole via the surface communication unit 318 in another method according to the invention synchronizes the tool 122. A mud-pulse telemetry signal carrying the start command is received at the downhole communications unit. The switch 326 is activated thereby providing power to initiate a predetermined test sequence. The surface clock 310 is synchronized with the downhole clock by initiating the surface clock when the start signal is transmitted. In this method there is a known lag time between the sending and receiving of the start signal. The lag is taken into consideration when setting the surface clock.

Surface operations are halted when the start signal is transmitted, or at a short predetermined time thereafter. When the surface display indicates that a test is complete, drilling operations are resumed until another start command is transmitted.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. An apparatus for MWD comprising:
   (a) a drill string;
   (b) a sensor mounted on the drill string for sensing a parameter of interest of a formation;
   (c) a first clocked controller disposed on the drill string for controlling operations of the sensor; and
   (d) a second clocked controller disposed at a surface location used for control of a drilling operation, the second clocked controller being synchronized with the first clocked controller.

2. An apparatus according to claim 1, wherein the drill string is selected from a group consisting of (i) a jointed drill pipe and (ii) a coiled tubing.

3. An apparatus according to claim 1, wherein the sensor is a NMR sensor.

4. An apparatus according to claim 3, wherein the first clocked controller initiates and terminates operation of the NMR sensor over predetermined time intervals.

5. An apparatus according to claim 1, wherein the second clocked controller further comprises an output device for providing an output indicative of operation of the NMR sensor to operating personnel.

6. An apparatus according to claim 5, wherein the output device is selected from a group consisting of (i) a monitor, (ii) an audible alarm, and (iii) a timing gauge.

7. An apparatus according to claim 5, wherein the second clocked controller further comprises a transmitter for sending a start command at a start of said predetermined time intervals to the first clocked controller having a receiver for receiving the start command.

8. An apparatus according to claim 1, further comprising an extendable probe mounted on the drill string and having a port in fluid communication with the sensor and formation, and a pump disposed in the drill string for urging formation fluid into the port.

9. An apparatus according to claim 8, further comprising a sample chamber mounted on the drill string, wherein the sample chamber is in fluid communication with the port such that the formation fluid entering the port is transferred to the sample chamber.

10. An apparatus according to claim 9, wherein the sensor is operatively associated with the sample chamber and formation fluid contained in the sample chamber includes a characteristic indicative of the formation parameter of interest.

11. A method for MWD comprising:
    (a) conveying a drill string into a well borehole;
    (b) operating a sensor for determining a parameter of interest of a formation traversed by the borehole with a sensor mounted on the drill string;
    (c) controlling operation of the sensor with a first clocked controller disposed on the drill string; and
    (d) synchronizing a second clocked controller disposed at a surface location with the first clocked controller, wherein the second clocked controller is used for control of a drilling operation.

12. A method according to claim 11, wherein the sensor is conveyed on a drill string is selected from a group consisting of (i) a jointed drill pipe and (ii) a coiled tubing.

13. A method according to claim 11, wherein sensing a parameter of interest is performed using a NMR device.

14. A method according to claim 11, wherein the parameter of interest is selected from a group consisting of (i) a longitudinal relaxation time; (ii) transverse relaxation time; (iii) porosity; (iv) pore-size distribution; (v) hydrocarbon identification; (vi) acoustic velocity; (vii) formation pressure; and (viii) dielectric constant of formation fluid.

15. A method according to claim 11, further comprising initiating and terminating operation of the sensor over predetermined time intervals.

16. A method according to claim 11, wherein the second clocked controller further comprises an output device, the method further comprising providing an output indicative of operations of the sensor using the output device.

17. A method according to claim 16, wherein using the output device is selected from a group consisting of (i) using a monitor, (ii) using an audible alarm, and (iii) using a timing gauge.

18. A method according to claim 16, wherein the second clocked controller further comprises a transmitter, the first clocked controller further comprises a receiver, the method further comprising using the transmitter to send a start command at a start of the predetermined time intervals to the receiver, receiving the start command at the receiver, and initiating operation of the sensor using the start command.

19. A method according to claim 11, wherein the drill string includes an extendable probe having a port operatively associated with the sensor and a pump, the method further comprising extending the probe until the port is in fluid communication with the formation and urging formation fluid into the port using the pump.

20. A method according to claim 19, wherein the drill string includes a sample chamber operatively associated with the pump and port, the method further comprising transferring formation fluid from the port to the sample chamber and sensing the parameter of interest using the fluid contained in the sample chamber.

21. A method according to claim 16, further comprising adjusting the drilling operation in response to the output of the output device.

22. A method according to claim 11, wherein the clocked controllers are synchronized while the first clocked controller is at the surface.

23. A method according to claim 11, wherein the clocked controllers are synchronized while the first clocked controller is in the well borehole.

* * * * *